(12) United States Patent
Nass et al.

(10) Patent No.: US 11,732,720 B2
(45) Date of Patent: Aug. 22, 2023

(54) TURBOMACHINE INNER HOUSING

(71) Applicant: Siemens Energy Global GmbH & Co. KG, Munich (DE)

(72) Inventors: Dieter Nass, Moers (DE); Shahrouz Nejati-Rad, Krefeld (DE); Kai Schickmann, Düsseldorf (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 108 days.

(21) Appl. No.: 16/958,790

(22) PCT Filed: Dec. 21, 2018

(86) PCT No.: PCT/EP2018/086644
§ 371 (c)(1),
(2) Date: Jun. 29, 2020

(87) PCT Pub. No.: WO2019/137804
PCT Pub. Date: Jul. 18, 2019

(65) Prior Publication Data
US 2020/0331063 A1 Oct. 22, 2020

(30) Foreign Application Priority Data
Jan. 10, 2018 (DE) ................... 10 2018 200 287.8

(51) Int. Cl.
*F04D 17/12* (2006.01)
*B33Y 10/00* (2015.01)
(Continued)

(52) U.S. Cl.
CPC ............ *F04D 17/125* (2013.01); *B33Y 10/00* (2014.12); *B22F 10/12* (2021.01); *B22F 10/14* (2021.01);
(Continued)

(58) Field of Classification Search
None
See application file for complete search history.

(56) References Cited

U.S. PATENT DOCUMENTS

| 1,050,419 A | 1/1913 | Banner |
| 2,017,826 A | 10/1935 | Aisenstein et al. |

(Continued)

FOREIGN PATENT DOCUMENTS

| CN | 101684827 A | 3/2010 |
| CN | 101956187 A | 1/2011 |

(Continued)

OTHER PUBLICATIONS

PCT International Search Report and Written Opinion of International Searching Authority dated Apr. 17, 2019 corresponding to PCT International Application No. PCT/EP2018/086644 filed Dec. 21, 2018.

*Primary Examiner* — Kayla Mccaffrey

(57) ABSTRACT

A turbomachine inner housing for a radial turbomachine, wherein the turbomachine inner housing includes a partial joint along a longitudinal axis, in particular a rotor longitudinal axis, such that the turbomachine inner housing can be divided into a lower part and an upper part, wherein the turbomachine inner housing is designed for a radial turbomachine with at least two stages, wherein the turbomachine inner housing has a return stage in each case between two stages, wherein the lower part and/or the upper part is designed in one piece so as to span at least two stages at least in sections. In order to improve a turbomachine inner housing of this kind, the lower part and/or the upper part is designed in one piece so as span at least two stages at least in sections.

12 Claims, 1 Drawing Sheet

(51) Int. Cl.
  *B33Y 80/00* (2015.01)
  *F01D 25/26* (2006.01)
  *F04D 29/42* (2006.01)
  *B22F 10/12* (2021.01)
  *B22F 10/14* (2021.01)
  *B22F 10/18* (2021.01)
  *B22F 10/25* (2021.01)
  *B22F 10/28* (2021.01)

(52) U.S. Cl.
  CPC .............. *B22F 10/18* (2021.01); *B22F 10/25* (2021.01); *B22F 10/28* (2021.01); *B33Y 80/00* (2014.12); *F01D 25/265* (2013.01); *F04D 29/4206* (2013.01); *F04D 29/426* (2013.01); *F05D 2230/31* (2013.01)

(56) References Cited

U.S. PATENT DOCUMENTS

| | | | |
|---|---|---|---|
| 2,339,186 A | | 1/1944 | Noble |
| 4,509,906 A | * | 4/1985 | Hattori ................. F04C 18/348 523/435 |
| 5,846,052 A | | 12/1998 | Kameda |
| 5,980,203 A | * | 11/1999 | Zatorski ................ F04D 23/003 415/174.4 |
| 5,989,664 A | * | 11/1999 | Takayama ............ B29C 70/088 428/36.1 |
| 6,203,275 B1 | | 3/2001 | Kobayashi et al. |
| 9,303,655 B2 | * | 4/2016 | Griffin ................. F04D 17/122 |
| 10,415,589 B2 | | 9/2019 | Boehm et al. |
| 2007/0183892 A1 | | 8/2007 | Sorokes |
| 2009/0044548 A1 | | 2/2009 | Masoudipour et al. |
| 2011/0014059 A1 | | 1/2011 | Giovannetti et al. |
| 2012/0224955 A1 | | 9/2012 | Vine |
| 2017/0030377 A1 | | 2/2017 | Huth et al. |
| 2017/0082070 A1 | * | 3/2017 | Miller ................... F04D 29/046 |
| 2019/0001372 A1 | * | 1/2019 | Crawford ................ B05D 3/12 |
| 2020/0300252 A1 | * | 9/2020 | Yamashita ............ F04D 17/122 |

FOREIGN PATENT DOCUMENTS

| | | |
|---|---|---|
| CN | 201891610 U | 7/2011 |
| CN | 202182035 U | 4/2012 |
| CN | 202250885 U | 5/2012 |
| CN | 107073561 A | 8/2017 |
| CN | 107237780 A | 10/2017 |
| DE | 59628462 T2 | 4/2004 |
| DE | 102009009731 A1 | 8/2010 |
| DE | 102014207461 A1 | 10/2015 |
| DE | 102013225065 B4 | 4/2016 |
| EP | 1860326 A1 | 11/2007 |
| EP | 2133572 A1 | 12/2009 |
| EP | 2918789 A1 | 9/2015 |
| EP | 3421808 A1 | 1/2019 |
| GB | 747359 A | 4/1956 |
| JP | S5288944 A | 7/1977 |
| JP | S5417101 A | 2/1979 |
| JP | S54017101 U | 2/1979 |
| JP | H0988864 A | 3/1997 |
| JP | H1089279 A | 4/1998 |
| JP | 2005282548 A | 10/2005 |
| WO | 2007137959 A1 | 12/2007 |
| WO | 2010034602 A1 | 4/2010 |
| WO | 2014086730 A1 | 6/2014 |
| WO | 2015144401 A1 | 10/2015 |
| WO | 2016026825 A1 | 2/2016 |
| WO | 2016078800 A1 | 5/2016 |
| WO | 2016113107 A1 | 7/2016 |
| WO | 2016188696 A1 | 12/2016 |
| WO | 2016198210 A1 | 12/2016 |
| WO | 2017045823 A1 | 3/2017 |
| WO | 2017060036 A1 | 4/2017 |
| WO | 2017063861 A1 | 4/2017 |
| WO | 2017093461 A1 | 6/2017 |
| WO | 2017102286 A1 | 6/2017 |
| WO | 2017121539 A1 | 7/2017 |
| WO | 2017133812 A1 | 8/2017 |
| WO | 2017137262 A1 | 8/2017 |
| WO | 2017137376 A1 | 8/2017 |
| WO | 2017157620 A1 | 9/2017 |
| WO | 2017167615 A1 | 10/2017 |
| WO | 2017174233 A1 | 10/2017 |
| WO | 2017174234 A1 | 10/2017 |
| WO | 2017182220 A1 | 10/2017 |
| WO | 2017182221 A1 | 10/2017 |
| WO | 2017194274 A1 | 11/2017 |
| WO | 2017194387 A1 | 11/2017 |
| WO | 2017194451 A1 | 11/2017 |

\* cited by examiner

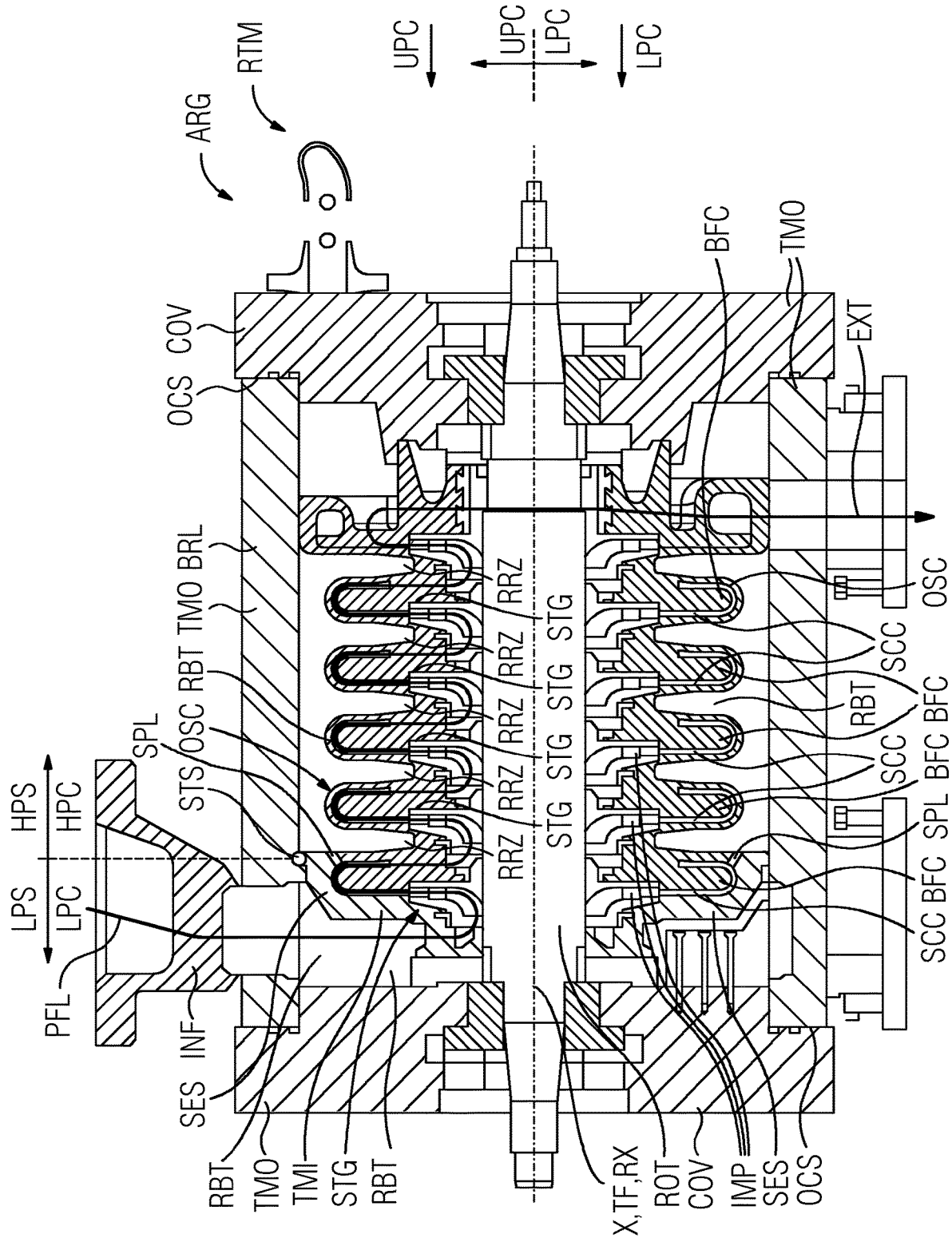

TURBOMACHINE INNER HOUSING

CROSS REFERENCE TO RELATED APPLICATIONS

This application is the US National Stage of International Application No. PCT/EP2018/086644 filed 21 Dec. 2018, and claims the benefit thereof. The International Application claims the benefit of German Application No. DE 10 2018 200 287.8 filed 10 Jan. 2018. All of the applications are incorporated by reference herein in their entirety.

FIELD OF INVENTION

The invention relates to a turbomachine inner housing for a radial turbomachine, wherein the turbomachine inner housing has a dividing line along a longitudinal axis, in particular a rotor longitudinal axis, such that the turbomachine inner housing can be divided into a lower part and an upper part, wherein the turbomachine inner housing is designed for a radial turbomachine comprising at least two stages, wherein the turbomachine inner housing has a return stage between two stages in each case, wherein the lower part and/or the upper part is formed in one piece, spanning at least two stages at least in some sections.

BACKGROUND OF INVENTION

Radial turbomachines of the type mentioned at the outset, with generic turbomachine inner housings, are already known from the printed documents WO2016026825-A1, WO2010034602-A1, WO2007137959-A1 and EP1860326-A1.

A turbomachine inner housing or an inner housing of a turbomachine, in particular a radial turbomachine, is always surrounded by an outer housing. The outer housing here is substantially sealed such that appreciable quantities of process fluid cannot escape from the outer housing. If shaft openings are provided in the outer housing, these are sealed by a shaft seal. Leaks which occur for technical reasons, although undesired, can arise at these points. Essentially, a drive for a compressor or a pump, for example, can also be provided within the outer housing so that a shaft opening is not required. In this case, the corresponding seal of the outer housing is actually hermetic.

A corresponding turbomachine in the sense of the invention serves to transfer technical energy from or to the process fluid by means of a rotor, which extends along a rotational axis. The pressure of the process fluid is either built-up or reduced in the axial extent of the turbomachine inner housing, so that the substantial pressure difference in the turbomachine or over the turbomachine is produced between the axial ends of the turbo machine inner housing. In the simplest case, a process fluid flows through the turbomachine, from an inlet to an outlet. Essentially, it is also possible that partial flows are occasionally supplied or diverted. In the case of a radial turbomachine, a deflection of the flow from the axial direction to the radial direction, or vice versa, takes place in each individual impeller.

A multi-stage design as interpreted in this document refers to a construction with a plurality of impellers (in the interpretation according to this document, one impeller corresponds to one stage) in which a diversion from a flow direction radially outwards to a flow direction radially inwards has to take place. In the case of a compressor, the process fluid, which leaves the impeller flowing radially outwards, has to be reversed through 180 degrees radially inwards in terms of the flow direction and supplied to the following impeller substantially axially again. To this end, radial turbomachines have so-called return stages. Such return stages are usually vaned annular channels, which have a diffusor with a flow direction radially outwards and implement a 180-degree reversal of the flow direction via a correspondingly constructed annular channel. The process fluid is then guided radially inwards. The diffusor and/or the return path radially inwards generally have guide vanes which divide the annular channel, which is, in any case, already formed in a relatively complicated manner, into individual flow channels in the circumferential direction. For optimum aerodynamics, it is moreover desirable to configure the corresponding guide vanes three-dimensionally, which means that the geometric configuration of these components or return stages is extremely complex. It is currently barely possible, if at all, to realize the three-dimensional shaping of the return blading technically by means of conventional machining methods. For assembly purposes, such return stages or turbomachine inner housings, which substantially consist of these return stages, are generally divided into an upper part and a lower part along a dividing line parallel to the longitudinal axis. Moreover, conventional production of this highly complex geometry requires an axial division of each individual return stage into at least two axial sections, which, when combined, form the described annular channel. Conventional turbomachine inner housings thus consist of two axial stacks of individual return stage components which, together forming an upper part and a lower part, form a complete turbomachine inner housing. This modular construction is very complex owing to the many individual parts and the many fastening procedures and sealing measures which are therefore needed. Moreover, the different individual parts not only have to be sealed with respect to one another, but also aligned accordingly with respect to one another. In addition to the complex production of the annular return stage flow channels, the production of the sealing surfaces and the many required centering and fastening measures is very complex and expensive.

SUMMARY OF INVENTION

Starting with the disadvantages described above, the object of the invention is to at least partially eliminate these problems. To achieve the object presented according to the invention, a turbomachine housing of the type defined at the outset with the additional features of the characterizing part of the independent claim is proposed. An arrangement with such a turbomachine inner housing is moreover proposed.

Unless stated otherwise, terms such as axial, radial, circumferential direction are used in relation to a longitudinal axis of the turbomachine inner housing, which is at least parallel to a rotor longitudinal axis of a corresponding radial turbomachine.

Unless stated otherwise, the descriptions in this document relate to a turbomachine equipped according to the invention, which is designed as a compressor. Alternatively, the turbomachine equipped according to the invention can also be designed as an expander, without this being expressly mentioned. Based on their expert knowledge, persons skilled in the art are also capable of applying the present explanations of the invention mutatis mutandis to an expander.

When using the term "one piece", the invention is referring to a component which is formed such that it cannot be non-destructively divided, which means that the component is either formed from a homogenous piece of material or is formed as a unit with material fit or at least form fit such that it cannot be non-destructively separated again.

The one-piece design of the upper part and/or the lower part over at least one section, spanning two stages, of the turbomachine inner housing results in excellent reinforcement of this structure since, in particular, guide vanes in the annular chambers or flow channels of the return stages of the turbomachine inner housing make for a combination with a very good load-bearing capacity. It is therefore particularly provided that the return stages are return stages with a vaned construction or which have guide vanes.

Each return stage formed in one piece particularly has guide vanes at least in the section leading radially inwards (flow direction) and/or in the section leading radially outwards (flow direction). Accordingly, not only is a particularly aerodynamically advantageous and efficient configuration ensured, but also particularly good rigidity of this one-piece section.

Another aspect of the invention expediently provides that the turbomachine housing is made from up to 50% metal by weight. The turbomachine inner housing is particularly made from a maximum of 30% metal by weight. A particularly further development of the invention provides that the turbomachine inner housing is made from at least 50% plastic by weight, advantageously 30% plastic by weight (unless stated otherwise, all percentage data in this document relate to the weight). Compared to conventional designs of turbomachine inner housings, the design according to the invention enables this component to be produced largely from plastic, since the one-piece design ensures mechanical rigidity which would otherwise only be ensured by constructing this component from metal.

So that the turbomachine inner housing is also sufficiently wear-resistant, it is expedient if the surface which is exposed to a process fluid during operation is provided, at least in some regions, with a coating which is more wear-resistant than the base material coated with this coating. Such a coating can particularly advantageously be at least partially made from a metal or be produced from corresponding metal pieces or using metal inlays.

A particularly expedient further development of the invention provides that the turbomachine housing has at least two return stages, wherein the turbomachine inner housing has an inner surface defining the inside of the turbomachine inner housing and an outer surface, wherein the outer surface has at least one recess extending radially inwards axially between the two return stages. In the case of a radial turbomachine, part of the impeller which extends such that it takes in the process fluid axially and diverts it radially is generally located axially between the annular flow channels of the return stages which form a U shape in cross-section. In particular, in this region, the axial region located radially further outwards is substantially aerodynamically functionless, since the annular channel of the return stages extends axially from the outflow from the impeller to the axial inflow to the following impeller (this flow direction data applies to the compressor; for the expander, the flow direction is reversed; without further indication, the example of the compressor will always be used below for such flow direction data). Accordingly, it is useful to provide the axial region between two return stages with a recess or opening, which extends radially inwards. Such recesses significantly reduce the self-weight of the turbomachine inner housing depending on their size and can continue radially inwards, for instance to the outer diameter of the impeller. The radially inner base of the corresponding recesses is advantageously located in the region of the impeller outer diameter of the adjoining stages plus/minus 20% of the impeller outer diameter. Such a recess, or recesses of this type, particularly extends or extend over at least 35% of the cross-sectional area of the turbomachine inner housing. In this case, 100% represents an assumed cross-sectional area which forms the midpoint between the two cross-sectional areas actually present in the region of the axially adjacent impellers of the turbomachine inner housing (cross-sectional area is arranged perpendicularly to the longitudinal axis). In the case of a cylindrical turbomachine inner housing, 100% of the cross-sectional area refers to the constant cross-sectional area. A key advantage of such recesses consists in that an externally applied pressure does not have the effect of altering the axial length, at least in the region of the recess. In fact, depending on the rigidity of the turbomachine inner housing and depending on the pressure between the inner housing and the outer housing, significant deformations of the upper part and the lower part of the turbomachine inner housing can occur without these recesses. Accordingly, such recesses reduce requirements relating to the rigidity of the turbomachine inner housing.

The advantages according to the invention are particularly clear in an arrangement comprising a turbomachine inner housing of the type according to the invention or a corresponding further development and a turbomachine outer housing, wherein the arrangement has an axial low pressure side and an axial high pressure side, wherein the arrangement has a seal, which extends in the circumferential direction and is arranged in a space between the high pressure side and the low pressure side such that the space is divided into a high pressure part and a low pressure part. The arrangement is expediently configured such that the high pressure part is under the final pressure of the turbomachine during operation and the low pressure part is under the suction pressure during operation. In this case, it is particularly expedient if the recesses between the two adjacent return stages are arranged in the region of the high pressure part so that, on the one hand, the high pressure is at least partially compensated axially and, on the other, the resulting force distribution on the outer surface of the turbomachine inner housing ensures particularly uniform contact pressure of the lower part against the upper part of the turbomachine inner housing during operation and correspondingly fewer measures need to be taken for fastening and sealing purposes between the two components.

The turbomachine outer housing of this arrangement is particularly expediently formed in a barrel design, such that a dividing line is provided transversely to the longitudinal axis. It is useful here if the dividing line separates a cover from a barrel of the turbomachine outer housing. In this case, the person skilled in the art understands the cover to be an axial termination of the barrel, which does not have a casing function.

At least the section of the turbomachine inner housing which is formed in one piece, spanning at least two stages, is particularly expediently produced by means of an additive manufacturing method (generative production method or additive production). Corresponding additive manufacturing methods are already known from WO2016/198210, WO2017/060036, WO2017/102286, WO2017/121539, WO2017/137376, WO2017/137262, WO2017/167615, WO2017/182220, WO2017/182221, WO2017/194274, WO2017/194451, WO2015/144401, WO2017/045823, WO2017/063861, WO2017/093461, WO2017/133812, WO2017/174234, WO2017/174233, WO2017/194387, WO2016/078800, WO2016/113107, WO2016/188696 and WO2017/157620. Essentially, all additive production methods can be applied to the configuration according to the invention: e.g. selective laser melting (SLM), selective laser sintering (SLS), selective heat sintering (SHS), binder jetting (strengthening powder material with a binder), electron beam melting (EBM), fused deposition modeling (FDM or also fused filament fabrication (FFF)), buildup welding or cladding, wax deposition modeling (WDM), contour crafting, metal power application (MPA), cold gas injection and electron beam welding (EBW), stereolithography (SLA)+ micro-SLA, methods which use digital light processing (DLP) for light exposure and liquid composite molding (LCM), laminated object modeling (LOM), 3D screen printing of metals and light-controlled electrophoretic separation.

An advantageous further development of the invention provides that the division of the turbomachine inner housing into a one-piece lower part and a one-piece upper part is realized with the exception of a suction insert on the low pressure side, which is advantageously undivided in the circumferential direction and is combined with the lower part LPC and the upper part UPC at a substantially axial division at a dividing line SPL to form the turbomachine inner housing TMI. A seal between the turbomachine inner housing and the turbomachine outer housing is advantageously located at the suction insert, which seal separates the high pressure side from the low pressure side. The suction insert is advantageously made from metal here so that it is able to absorb the mechanical load resulting from the pressure difference.

Selective laser melting, electronic beam melting, is particularly expedient here. It is particularly useful here if not only at least the section mentioned, but at an entire upper part or an entire lower part or both the upper part and the lower part, are comprehensively formed in one piece. Accordingly, the application of an additive manufacturing method of the type mentioned above can be expediently applied to the entire turbomachine inner housing.

BRIEF DESCRIPTION OF THE DRAWINGS

The invention is described in more detail below with the aid of a specific exemplary embodiment with reference to a drawing, which shows:

FIG. 1 a schematic longitudinal section through an arrangement or a radial turbomachine with a turbomachine inner housing according to the invention.

DETAILED DESCRIPTION OF INVENTION

FIG. 1 shows an arrangement ARG or a radial turbomachine RTM with a turbomachine inner housing TMI according to the invention. The turbomachine inner housing TMI is surrounded by a turbomachine outer housing TMO, through which a process gas PFL flows from an inflow IMF to an outflow EXT. In the specific exemplary embodiment of a radial turbocompressor, the process fluid PFL is subjected to a relatively high pressure when flowing through the turbomachine inner housing TMI by means of impellers IMP, which are a constituent part of a rotor ROT rotating about a longitudinal axis X or rotational axis RX. The turbomachine inner housing TMI here is a static, in particular aerodynamically-acting component and the rotor ROT with the impellers IMP introduces technical energy from an outer drive (not illustrated in more detail) into the process fluid PFL. For the purpose of connecting a drive, the left shaft end, like the right shaft end, of the rotor is guided axially out of the outer housing TMO at a through-opening. The corresponding shaft openings are sealed by means of a shaft seal (not explained in more detail) with respect to the pressure difference between the process fluid inside the outer housing TMO and the environment.

The turbomachine inner housing TMI receives the process fluid PFL in the turbomachine outer housing TMO within a space RBT. The space RBT is divided into a high pressure side HPS and a low pressure side LPS by means of a seal STS between the turbomachine inner housing TMI and the turbomachine outer housing TMO. The seal STS extends in the circumferential direction (with respect to the longitudinal axis X or rotor axis RX) and separates an axial high pressure part HPC of the space RBT from an axial low pressure part LPC. The inflow IMF of the turbomachine outer housing TMO leads into the low pressure part LPC and the outflow EXT is in fluid-conducting communication with the high pressure part HPC. The seal STS is designed for axial contact, so that, during operation, the higher pressure in the high pressure part HPC pushes the turbomachine inner housing TMI in the direction of the low pressure part LPC and, accordingly, the full circumferential contact ensures the leak-tightness of the seal STS.

The radial turbomachine RTM shown has six impellers and therefore, in the interpretation according to the invention, six stages STG or compressor stages. A so-called return stage BFC in the turbomachine inner housing TMI is formed between two stages in each case. The return stage receives the process fluid PFL flowing radially outwards from the impeller IMP located upstream. In the section of the return stage BFC which acts firstly as a diffusor, the process fluid is slowed down and substantially freed of undesired swirl components by guide vanes provided there. In the section of the annular channel of the return stage BFC which is located downstream, the process fluid is deflected radially inwards through 180° and then continues radially inwards through a section equipped with guide vanes. Downstream, a 90 degree deflection in the axial direction to the next impeller IMP located upstream takes place. In the specific exemplary embodiment, the turbomachine inner housing TMI is designed as a combination of a one-piece lower part LPC and a one-piece upper part UPC with a dividing line along a longitudinal axis X. Similarly, the upper part UPC and the lower part LPC of the turbomachine inner housing can also be formed in one piece, also spanning at least two stages only in some sections, and this can also be the case for only the lower part LPC or the upper part UPC. This needs no further illustration.

In the specific exemplary embodiment, the division of the turbomachine inner housing TMI into a lower part LPC and an upper part UPC is realized with the exception of a suction insert SES, which, undivided by a substantially axial division in the circumferential direction, is combined with the lower compartment LPC and the upper compartment UPC at a dividing line SPL to form the turbomachine inner housing TMI. The seal STS, which separates the high pressure side HPS from the low pressure side LPS, lies against the suction insert SES. The suction insert SES is advantageously made from metal here, so that it is able to absorb the mechanical load resulting from the pressure difference.

In the exemplary embodiment, the turbomachine inner housing TMI is made from up to 50% metal by weight, advantageously up to 30% by weight. The turbomachine inner housing is particularly advantageously formed from 50%, or more than 50%, plastic by weight. In some regions, the turbomachine inner housing is provided with a coating SCC on surfaces which are exposed to the process fluid PFL during operation. This coating is made at least partially of metal.

The turbomachine inner housing defines an inner surface ISC and an outer surface OSC. The outer surface OSC is provided with a recess RRZ extending radially inwards axially between two return stages BFC in each case. This recess RRZ accounts for at least 35% of the cross-sectional area of the turbomachine inner housing TMI. Accordingly, during operation, the final pressure of the high pressure side HPS also acts in the region of these recesses RRZ and ensures, on the one hand, a relative low axial compressing force on the turbomachine inner housing TMI and, on the other, only a slight resultant deformation and a uniform contact of a sealing surface between the upper part UPC and the lower part LPC. Axial reinforcement of the upper part UPC and the lower part LPC is achieved by means of ribs in the recesses RRZ, which extend substantially in the axial-radial direction in a planar manner.

The pressure in the individual recesses in the region of the outer surface OSC during operation is generally lower than the final pressure on the high pressure side HPS. Owing to the intricate contour in the region of the outer surface OSC, this operating pressure acts in such a way that the dividing line TF between the upper part UPC and the lower part LPC is compressed to prevent internal leaks. In a conventional metal housing, the joining regions are thick-walled with remaining production-related gaps, which result in internal leaks.

The turbomachine outer housing TMO is formed in a barrel design in such a way that a dividing line OCS is provided on both sides, transversely to the longitudinal axis X in each case. A cover COV forms an axial termination of a barrel BRL of the turbomachine outer housing TMO axially on both sides. The cover does not have a casing function and merely forms the axial termination.

The turbomachine inner housing TMI has been produced by means of an additive manufacturing method, at least in the region in which at least two stages are comprehensively formed in one piece.

The invention claimed is:

1. A turbomachine inner housing for a radial turbomachine, the turbomachine inner housing comprising:
   wherein the turbomachine inner housing has a dividing line along a longitudinal axis, or a rotor longitudinal axis, such that the turbomachine inner housing is divided into a lower part and an upper part,
   wherein the turbomachine inner housing is designed for a radial turbomachine comprising at least two stages,
   wherein the turbomachine inner housing has a return stage having a vaned guide section defined by guide vanes between two stages in each case,
   wherein the lower part and/or the upper part of the turbomachine inner housing, including the return stage having the vaned guide section defined by the guide vanes, is formed as one structural piece, over at least one section, spanning the at least two stages of the radial turbomachine,
   wherein the turbomachine inner housing has at least two return stages,
   wherein the turbomachine inner housing has an inner surface defining the inside of the turbomachine inner housing and an outer surface,
   wherein the outer surface has a plurality of recesses extending radially inwards axially between two return stages,
   wherein, during operation, the pressure in individual recesses of the plurality of recesses in the region of the outer surface is lower than the final pressure on a high pressure side.

2. The turbomachine inner housing as claimed in claim 1, wherein the turbomachine inner housing is made from up to 50% metal.
3. The turbomachine inner housing as claimed in claim 2, wherein the turbomachine inner housing is made from at least 50% plastic by weight.
4. The turbomachine inner housing as claimed in claim 1, wherein a surface which is exposed to a process fluid during operation is provided with a coating, at least in some regions.
5. The turbomachine inner housing as claimed in claim 4, wherein the coating is made at least partially from metal.
6. The turbomachine inner housing as claimed in claim 1, wherein the plurality of recesses extend over at least 35% of a cross-sectional area of the turbomachine inner housing.
7. An arrangement, comprising:
   a turbomachine inner housing as claimed in claim 1, and
   a turbomachine outer housing surrounding the turbomachine inner housing,
   wherein the arrangement has an axial low pressure side and an axial high pressure side, wherein the arrangement has a seal, which extends in a circumferential direction and is arranged in a space between the high pressure side and the low pressure side such that the space is divided into a high pressure part and a low pressure part.
8. The arrangement as claimed in claim 7, wherein the plurality of recesses are arranged on the axial high pressure side.
9. The arrangement as claimed in claim 8,
   wherein the turbomachine inner housing is formed in a barrel design such that a dividing line is provided transversely to the longitudinal axis.
10. The arrangement as claimed in claim 9,
    wherein the dividing line separates a cover from a barrel of the turbomachine housing.
11. The turbomachine inner housing as claimed in claim 1,
    wherein the at least one section is produced by means of an additive manufacturing method.
12. A turbomachine inner housing for a radial turbomachine, the turbomachine inner housing comprising:
    wherein the turbomachine inner housing has a dividing line along a longitudinal axis, or a rotor longitudinal axis, such that the turbomachine inner housing is divided into a lower part and an upper part,
    wherein the turbomachine inner housing is designed for a radial turbomachine comprising at least two stages,
    wherein the turbomachine inner housing has a return stage having a vaned guide section defined by guide vanes between two stages in each case,
    wherein the lower part and/or the upper part of the turbomachine inner housing, including the return stage having the vaned guide section defined by the guide vanes, is formed as one structural piece, over at least one section, spanning the at least two stages of the radial turbomachine,
    wherein the turbomachine inner housing has at least two return stages,
    wherein the turbomachine inner housing has an inner surface defining the inside of the turbomachine inner housing and an outer surface,
    wherein the outer surface has a plurality of recesses extending radially inwards axially between two return stages.

* * * * *